United States Patent
Jeon et al.

(10) Patent No.: US 9,191,052 B2
(45) Date of Patent: Nov. 17, 2015

(54) UNIVERSAL SUBSCRIBER IDENTIFICATION MODULE CARD, INCLUDING SECURITY CHIP, FOR MOBILE TERMINAL AND COMMUNICATION METHOD USING THE SAME

(71) Applicant: Electronics and Telecommunications Research Institute, Daejeon (KR)

(72) Inventors: Yong-Sung Jeon, Daejeon (KR); Jeong-Nyeo Kim, Daejeon (KR); Young-Sae Kim, Daejeon (KR); Hong-Il Ju, Daejeon (KR); Seung-Yong Yoon, Daejeon (KR); Hyun-Sook Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 13/918,501

(22) Filed: Jun. 14, 2013

(65) Prior Publication Data

US 2014/0024412 A1    Jan. 23, 2014

(30) Foreign Application Priority Data

Jul. 17, 2012 (KR) ........................ 10-2012-0077967
Feb. 28, 2013 (KR) ........................ 10-2013-0022215

(51) Int. Cl.
*H04M 1/38* (2006.01)
*H04B 1/3816* (2015.01)

(52) U.S. Cl.
CPC .................................. *H04B 1/3816* (2013.01)

(58) Field of Classification Search
CPC ......... H04B 1/38; H04B 1/3816; H04W 4/00; H04W 4/02; H04W 4/04; H04W 48/08; H04W 48/14
USPC ............ 455/558, 552.1, 41.1, 41.2, 466, 411, 455/557, 442, 556.1, 436, 435.1, 435.2, 455/41.3
See application file for complete search history.

(56) References Cited

U.S. PATENT DOCUMENTS 5,129,091 A * 7/1992 Yorimoto et al. ............. 713/323
2006/0214005 A1  9/2006 Agami et al.

(Continued)

FOREIGN PATENT DOCUMENTS

KR  10-2004-0046593 A  6/2004
KR  10-2009-0049795 A  5/2009

(Continued)

*Primary Examiner* — Olumide T Ajibade Akonai
*Assistant Examiner* — Tanisha Jackson

(57) ABSTRACT

Disclosed herein are a universal subscriber identification module card and a communication method using the same. The universal subscriber identification module card includes a Universal Subscriber Identification Module (USIM) chip, a pad, and a security chip. The USIM chip performs the user authentication of a mobile terminal. The pad electrically connects the USIM chip to the mobile terminal when the USIM chip is inserted into the mobile terminal. The security chip performs a security function for the mobile terminal independently of the USIM chip and shares the two power terminals of the pad with the USIM chip.

11 Claims, 6 Drawing Sheets

(56) References Cited

U.S. PATENT DOCUMENTS

| | | | |
|---|---|---|---|
| 2009/0143104 A1* | 6/2009 | Loh et al. | 455/558 |
| 2009/0280865 A1* | 11/2009 | Danis et al. | 455/558 |
| 2010/0090805 A1* | 4/2010 | Libotte | 340/10.2 |
| 2012/0086600 A1* | 4/2012 | Hoeksel et al. | 342/357.63 |
| 2012/0108169 A1* | 5/2012 | Degauque et al. | 455/41.1 |
| 2012/0292395 A1* | 11/2012 | Huang et al. | 235/492 |

FOREIGN PATENT DOCUMENTS

| | | |
|---|---|---|
| KR | 10-2010-0076239 A | 7/2010 |
| KR | 10-2011-0042549 A | 4/2011 |
| KR | 10-2011-0045366 A | 5/2011 |

* cited by examiner

UNIVERSAL SUBSCRIBER IDENTIFICATION MODULE CARD, INCLUDING SECURITY CHIP, FOR MOBILE TERMINAL AND COMMUNICATION METHOD USING THE SAME

CROSS REFERENCE TO RELATED APPLICATIONS

This application claims the benefit of Korean Patent Applications Nos. 10-2012-0077967 and 10-2013-0022215, respectively filed on Jul. 17, 2012 and Feb. 28, 2013, which are hereby incorporated by reference in their entirety into this application.

BACKGROUND OF THE INVENTION

1. Technical Field

The present invention relates to a technique for fabricating a new type of universal subscriber identification module card, which includes an additional security chip in the universal subscriber identification module card for the user authentication of a mobile terminal, thereby providing various security services to the mobile terminal in addition to a user authentication function.

2. Description of the Related Art

In general, smart cards for user authentication have often been inserted into mobile terminals since third Generation (3G) mobile communication. Smart cards for user authentication include Universal Subscriber Identification Module (USIM) cards or User Identification Module (UIM) cards for mobile phones for asynchronous 3G mobile communication, and Subscriber Identification Module (SIM) cards for mobile terminals for Global System for Mobile communications (GSM). Such USIM, UIM and SIM cards provide only a user authentication function. Current smart cards for mobile terminals are Universal IC Cards (UICCs) on which various application service applications, such as banking, securities, and electronic money, as well as a user authentication function for communication, are installed.

Such UICCs, however, were developed and standardized when a communication function was prioritized among the several functions of a mobile terminal. The existing UICCs have a limited security service in current smart mobile terminals. In order to use various services using Wi-Fi in addition to a communication function, there is a need for an apparatus that is better than the existing UICC and has various security functions.

There was disclosed a technology in which an additional chip for additional functions, as well as a chip for a user authentication function, is installed in a smart card, such as a universal subscriber identification module card for user authentication. However, the conventional technology has a limitation with respect to the efficient use of various chips because it uses only a serial interface stipulated in ISO/IEC7816-3 as means for communication between a mobile terminal and the chips. Furthermore, the serial interface has a limitation with respect to a security function requiring high-speed data communication because it has a maximum speed of 114 Kbps.

In terminals capable of high-speed data processing, such as current smart mobile terminals, a security function also requires high-speed data communication. Accordingly, smart cards inserted into smart mobile terminals need to provide a more improved security service using a high-speed I/O interface, such as a Universal Serial Bus (USB) interface, as well as a serial interface.

Korean Patent Application Publication No. 10-2011-0045366 discloses "Smart Card having Multiple Contact Points and Mobile Terminal using the Same" as a conventional technology.

SUMMARY OF THE INVENTION

Accordingly, the present invention has been made keeping in mind the above problems occurring in the prior art, and an object of the present invention is to include an additional security chip in a universal subscriber identification module card for the user authentication of a mobile terminal, thereby providing a better security service.

Another object of the present invention is to provide a communication method that is capable of providing both a user authentication function and various security services for a mobile terminal in such a manner that a USIM chip included in the universal subscriber identification module card of the mobile terminal communicates with the mobile terminal using a serial interface and a security chip communicates with the mobile terminal using a USB interface.

Yet another object of the present invention is to provide a Near Field Communication (NFC) service to an existing mobile terminal by including an NFC chip in a universal subscriber identification module card in addition to a USIM chip and a security chip.

In accordance with an aspect of the present invention, there is provided a universal subscriber identification module card, including a Universal Subscriber Identification Module (USIM) chip configured to perform the user authentication of a mobile terminal; a pad configured to electrically connect the USIM chip to the mobile terminal when the USIM chip is inserted into the mobile terminal; and a security chip configured to perform a security function for the mobile terminal independently of the USIM chip and to share the two power terminals of the pad with the USIM chip.

The security chip may communicate with the mobile terminal using a Universal Serial Bus (USB) terminal of the pad.

The USIM chip and the security chip may communicate with each other using Single-Wired Protocol (SWP) terminals.

The mobile terminal may communicate with the USIM chip using a serial I/O terminal and the USIM chip may communicate with the security chip using SWP terminals, so that the mobile terminal and the security chip communicate with each other.

The universal subscriber identification module card may further include a Near Field Communication (NFC) chip configured to provide an NFC function.

The NFC chip may share the two power terminals of the pad with the USIM chip and the security chip.

The security chip may communicate with the NFC chip using SWP terminals, so that the mobile terminal communicates with the NFC chip.

The universal subscriber identification module card may further include an antenna configured to be used for the NFC function.

The universal subscriber identification module card may be any one of a Universal Subscriber Identification Module (USIM) card for a mobile phone for asynchronous third-generation mobile communication, a User Identification Module (UIM) card, and a Subscriber Identification Module (SIM) card for a mobile terminal for Global System for Mobile communications (GSM), that is, a European digital mobile communication standard.

In accordance with another aspect of the present invention, there is provided a method for communication between a mobile terminal and a universal subscriber identification module card, the method including supplying power to both a Universal Subscriber Identification Module (USIM) chip and a security chip, included in the universal subscriber identification module card, through two power terminals of a pad included in the universal subscriber identification module card inserted into the mobile terminal; sending a reset response request message from the mobile terminal to one of the USIM chip and the security chip; receiving, by the mobile terminal, an Answer-To-Reset (ATR) response from the one of the USIM chip and the security chip corresponding to the reset response request message; and connecting, by the mobile terminal that has received the ATR response, to the one of the USIM chip and the security chip, and receiving, by the mobile terminal that has received the ATR response, a service from the one of the USIM chip and the security chip.

The reset response request message may include a clock signal and a reset signal when the one of the USIM chip and the security chip is the USIM chip. The receiving the ATR response from the one of the USIM chip and the security chip may include receiving, by the mobile terminal, the ATR response from the USIM chip that has received the clock signal and the reset signal. The connecting to the one of the USIM chip and the security chip may include connecting, by the mobile terminal that has received the ATR response, to the USIM chip, and receiving, by the mobile terminal that has received the ATR response, a user authentication service.

The reset signal may have a logic value of '1'.

The reset response request message may be a power-on command using a USB terminal when the one of the USIM chip and the security chip is the security chip. The receiving the ATR response from the one of the USIM chip and the security chip may include receiving, by the mobile terminal, the ATR response from the security chip that has received the power-on command. The connecting to the one of the USIM chip and the security chip may include connecting, by the mobile terminal that has received the ATR response, to the security chip, and receiving, by the mobile terminal that has received the ATR response, a security service.

The communication method may further include supplying power to an NFC chip, connected to the security chip through SWP terminals, through the two power terminals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
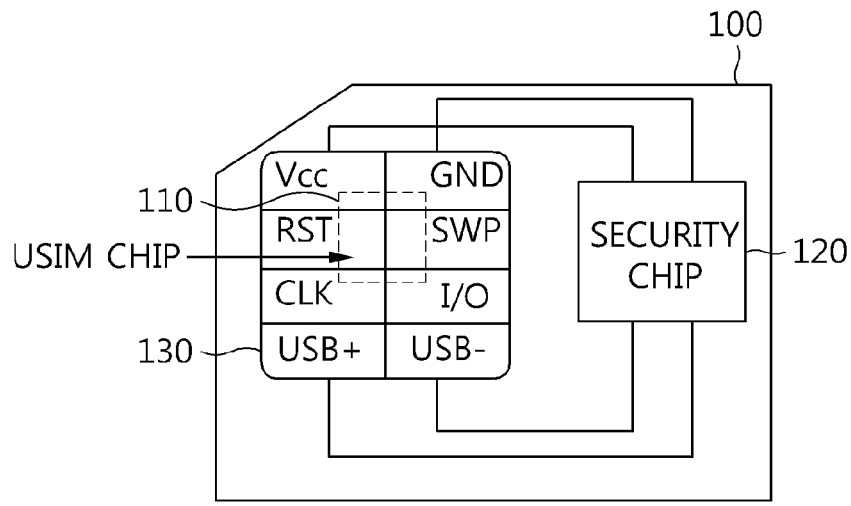
FIG. 1 is a diagram showing a universal subscriber identification module including an additional security chip according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

FIG. 1 is a diagram showing a universal subscriber identification module including an additional security chip according to an embodiment of the present invention.

Referring to FIG. 1, the universal subscriber identification module card 100 includes a USIM chip 110 configured to provide user authentication service to a mobile terminal, a pad 130 configured to electrically connect the USIM chip 110 to the mobile terminal, and a security chip 120 configured to provide a security service to the mobile terminal independently of the USIM chip 110.

The USIM chip 110 uses only a serial interface, and can communicate with a mobile terminal. The serial interface used by the USIM chip 110 includes a power terminal, a clock terminal, a reset terminal, and an I/O terminal. The terminals for the serial interface are located on the pad 130, and the terminals of the pad 130 are connected to the universal subscriber identification module card slot of a mobile terminal, thereby enabling communication.

In order to communicate with a mobile terminal, the security chip 120 uses a USB interface that is not used by the USIM chip 110. The USB interface for the security chip 120 includes a USB+ terminal and a USB− terminal. The terminals for the USB interface are located on the pad 130, and the terminals of the pad 130 are connected to the universal subscriber identification module card slot of a mobile terminal, thereby enabling communication. The power sources of a mobile terminal are used as power sources for both the security chip 120 and the USIM chip 110.

The pad 130 includes the power terminal, the clock terminal, the reset terminal, the I/O terminal, and the USB terminals that electrically connect the USIM chip 110 to a mobile terminal. The power sources Vcc and GND of a mobile terminal are used as power sources for the USIM chip 110 and the security chip 120 by using the pad 130.

Figure 2:
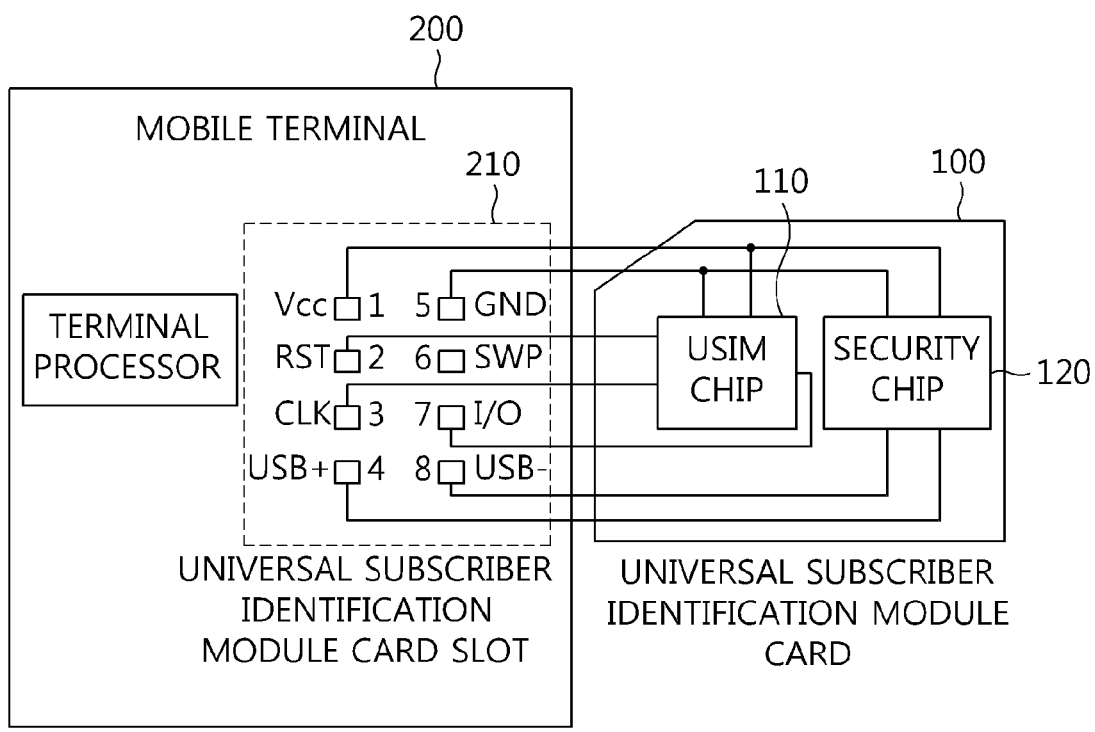
FIG. 2 is a diagram showing the connection of power and signals between a universal subscriber identification module, including an additional security chip, and a mobile terminal according to an embodiment of the present invention.

FIG. 2 is a diagram showing the connection of power and signals between a universal subscriber identification module, including an additional security chip, and a mobile terminal according to an embodiment of the present invention.

Referring to FIG. 2, it can be seen that signals that are provided by the mobile terminal 200 are transferred to the universal subscriber identification module card 100 through a universal subscriber identification module card slot 210.

The transferred signals are transferred to the USIM chip 110 and the security chip 120 through the pad 130 of the universal subscriber identification module card 100.

As shown in FIG. 2, the USIM chip 110 may communicate with the mobile terminal 200 by means of the serial interface using only two power sources Vcc and GND, a reset signal RTS, a clock signal CLK, and an I/O signal I/O.

Meanwhile, in the IC card standard specifications, the No. 4 contact terminal of the universal subscriber identification module card slot 210 is defined as being used the USB+ terminal and the No. 8 contact terminal thereof is defined as being used as the USB− terminal. However, existing USIM chips being used in mobile terminals do not use the USB interface, but uses only the serial interface.

The security chip 120 communicates with the mobile terminal by means of the USB interface using the USB+ terminal and the USB− terminal that are not used by the USIM chip 110. The power sources Vcc and GND that are provided by the mobile terminal 200 are used as power sources for both the security chip 120 and the USIM chip 110.

As described above, the mobile terminal 200 may be provided with a user authentication function and security service at the same time because the USIM chip 110 uses the serial interface and the security chip 120 uses the USB interface.

Figure 3:
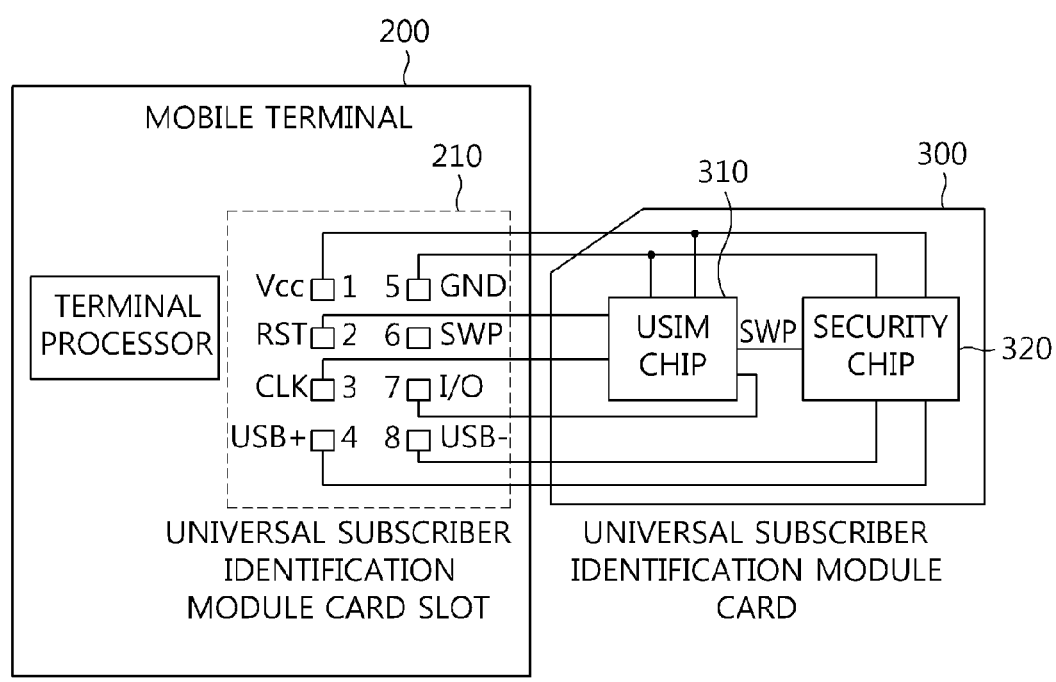
FIG. 3 is a diagram showing the connection of power and signals between a universal subscriber identification module, including an additional security chip, and a mobile terminal according to another embodiment of the present invention.

FIG. 3 is a diagram showing the connection of power and signals between a universal subscriber identification module, including an additional security chip, and a mobile terminal according to another embodiment of the present invention.

Referring to FIG. 3, it can be seen that signals that are provided by the mobile terminal 200 are transferred to the universal subscriber identification module card 300 through the universal subscriber identification module card slot 210.

The transferred signals are transferred to a USIM chip 310 and a security chip 320 through a pad included in the universal subscriber identification module card 300.

Furthermore, the USIM chip 310 and the security chip 320 may share their resources because the USIM chip 310 and the security chip 320 are coupled by Single-Wired Protocol (SWP) terminals.

As shown in FIG. 3, the USIM chip 310 may communicate with the mobile terminal 200 by means of a serial interface using only two power sources Vcc and GND, a reset signal RTS, a clock signal CLK, and an I/O signal I/O.

Meanwhile, in the IC card standard specifications, the No. 4 contact terminal of the universal subscriber identification module card slot 210 is defined as being used the USB+ terminal, and the No. 8 contact terminal thereof is defined as being used as the USB− terminal. However, an USIM chip being used in an existing mobile terminal does not use the USB interface, but uses only the serial interface.

The security chip 320 communicates with the mobile terminal 200 by means of the USB interface using the USB+ terminal and the USB− terminal that is not used by the USIM chip 310. The power sources Vcc and GND that are provided by the mobile terminal 200 are used as power sources for both the security chip 320 and the USIM chip 310.

Furthermore, the USIM chip 310 and the security chip 320 include the respective SWP terminals. Accordingly, the USIM chip 310 and the security chip 320 may share their resources because they are coupled by the SWP terminals.

As described above, the mobile terminal 200 may be provided with a user authentication function and a security service at the same time because the USIM chip 310 uses the serial interface and the security chip 320 uses the USB interface.

Figure 4:
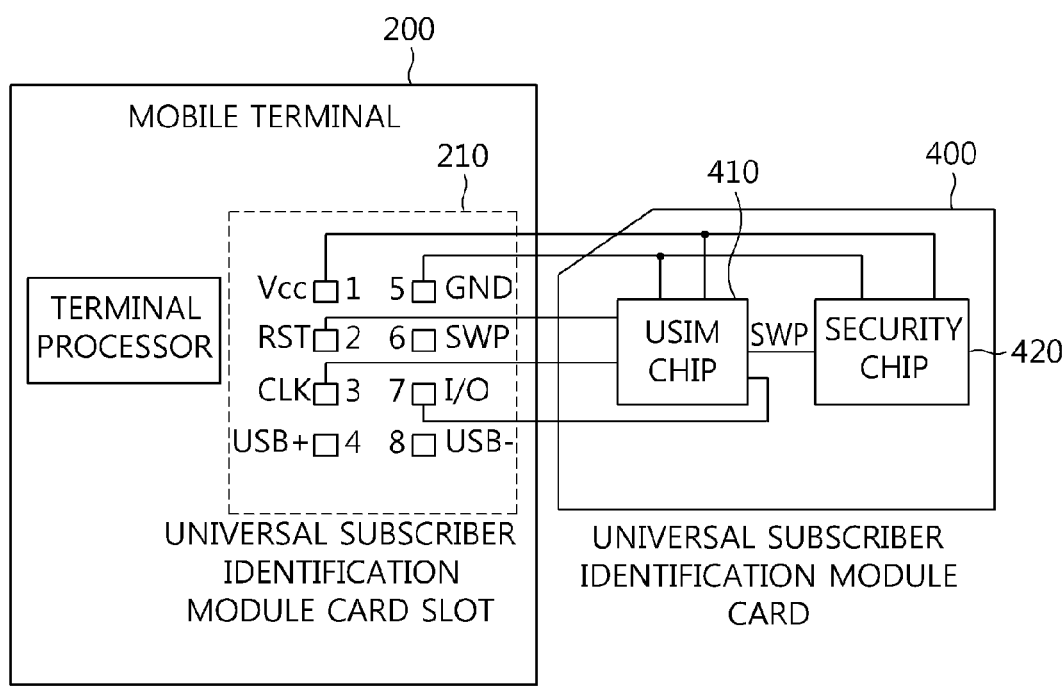
FIG. 4 is a diagram showing the connection of power and signals between a universal subscriber identification module, including an additional security chip, and a mobile terminal according to yet another embodiment of the present invention.

FIG. 4 is a diagram showing the connection of power and signals between a universal subscriber identification module, including an additional security chip, and a mobile terminal according to yet another embodiment of the present invention.

Referring to FIG. 4, it can be seen that signals that are provided by the mobile terminal 200 are transferred to a universal subscriber identification module card 400 through the universal subscriber identification module card slot 210.

The transferred signals are transferred to a USIM chip 410 through a pad included in the universal subscriber identification module card 400.

As shown in FIG. 4, the USIM chip 410 may communicate with the mobile terminal 200 by means of a serial interface using only two power sources Vcc and GND, a reset signal RTS, a clock signal CLK, and an I/O signal I/O.

Meanwhile, in the IC card standard specifications, the No. 4 contact terminal of the universal subscriber identification module card slot 210 is defined as being used the USB+ terminal, and the No. 8 contact terminal thereof is defined as being used as the USB− terminal. However, an USIM chip being used in an existing mobile terminal does not use the USB interface, but uses only the serial interface.

A security chip 420 does not include an additional interface that communicates with the mobile terminal 200. The USIM chip 410 and the security chip 420 include respective SWP terminals that enable the USIM chip 410 and the security chip 420 to share their resources. Since the USIM chip 410 and the security chip 420 include the SWP terminals, the security chip 420 does not communicate directly with the mobile terminal 200, but functions as a coprocessor that provides an additional security function necessary for the USIM chip 410. The power sources Vcc and GND that are provided by the mobile terminal 200 are used as power sources for both the security chip 420 and the USIM chip 410.

Figure 5:
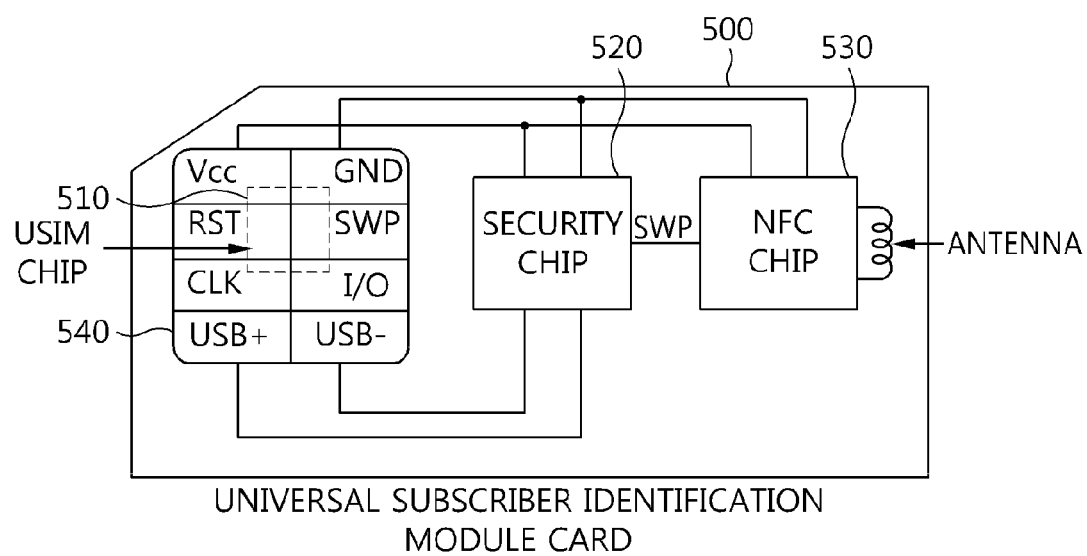
FIG. 5 is a diagram showing a universal subscriber identification module including an additional security chip and an NFC chip according to another embodiment of the present invention.

FIG. 5 is a diagram showing a universal subscriber identification module, including an additional security chip and an NFC chip, according to another embodiment of the present invention.

Referring to FIG. 5, the universal subscriber identification module card 500 includes a USIM chip 510 configured to provide user authentication service to a mobile terminal, a pad 540 configured to electrically connect the USIM chip 510 to the mobile terminal, a security chip 520 configured to provide security service to the mobile terminal independently of the USIM chip 510, and a Near Field Communication (NFC) chip 530 configured to provide an NFC function.

The USIM chip 510 uses only a serial interface, and may communicate with a mobile terminal. The serial interface that is used by the USIM chip 510 includes a power terminal, a clock terminal, a reset terminal, and an I/O terminal. The terminals of the serial interface are located on the pad 540, and the terminals of the pad 540 are connected to the universal subscriber identification module card slot of a mobile terminal, thereby enabling communication.

In order to communicate with a mobile terminal, the security chip 520 uses a USB interface that is not used by the USIM chip 510. The USB interface that is used by the security chip 520 includes a USB+ terminal and a USB− terminal. The terminals of the USB interface are located on the pad 540, and the terminals of the pad 540 are connected to the universal subscriber identification module card slot of a mobile terminal, thereby enabling communication. The power sources of a mobile terminal are used as power sources for both the security chip 520 and the USIM chip 510.

The NFC chip 530 does not use an additional interface that communicates with a mobile terminal. The security chip 520 and the NFC chip 530 include respective SWP terminals that enable their resources to be shared. The power sources of a mobile terminal are used as power sources for the NFC chip 530 like the USIM chip 510 and the security chip 520. Accordingly, when power is supplied to a mobile terminal, the mobile terminal may receive various NFC services to which a security function has been applied from the security chip 520 and the NFC chip 530 that are coupled by the SWP terminals.

Furthermore, the universal subscriber identification module card 500 includes an antenna for NFC.

The pad 540 includes a power terminal, a clock terminal, a reset terminal, an I/O terminal, and USB terminals that electrically connect the USIM chip 510 to a mobile terminal. The power sources Vcc and GND of a mobile terminal are used as power sources for the USIM chip 510, the security chip 520, and the NFC chip 530 using the pad 540.

By applying the embodiment of FIG. 5, various NFC services to which a security function has been applied can be provided to an existing mobile terminal.

Figure 6:
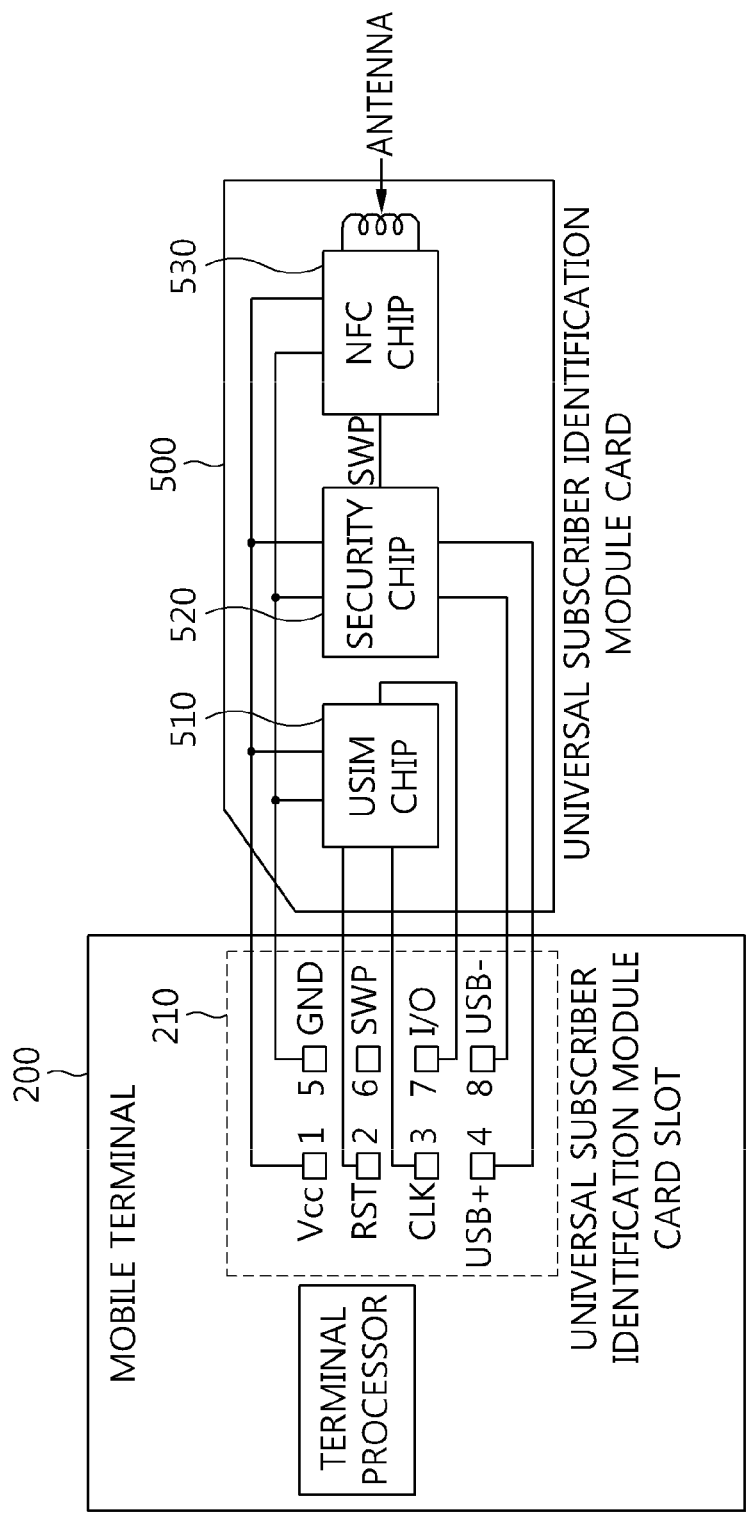
FIG. 6 is a diagram showing the connection of power and signals between the universal subscriber identification module, including an additional security chip and an NFC chip, and a mobile terminal according to yet another embodiment of the present invention.

FIG. 6 is a diagram showing the connection of power and signals between the universal subscriber identification module including an additional security chip and an NFC chip and a mobile terminal according to yet another embodiment of the present invention.

Referring to FIG. 6, it can be seen that signals that are provided by the mobile terminal 200 are transferred to the universal subscriber identification module card 500 through the universal subscriber identification module card slot 210.

The transferred signals are transferred to the USIM chip 510 and the security chip 520 through the pad 540 included in the universal subscriber identification module card 500.

As shown in FIG. 6, the USIM chip 510 can communicate with the mobile terminal 200 by means of a serial interface using only two power sources Vcc and GND, a reset signal RTS, a clock signal CLK, and an I/O signal I/O.

Meanwhile, in the IC card standard specifications, the No. 4 contact terminal of the universal subscriber identification module card slot 210 is defined as being used the USB+ terminal, and the No. 8 contact terminal thereof is defined as being used as the USB− terminal. However, an USIM chip being used in an existing mobile terminal does not use the USB interface, but uses only the serial interface.

The security chip 520 communicates with the mobile terminal 200 by means of the USB interface using the USB+ terminal and the USB− terminal that is not used by the USIM chip 510. The power sources Vcc and GND that are provided by the mobile terminal 200 are used as power sources for both the security chip 520 and the USIM chip 510.

The NFC chip 530 does not include an additional interface that is used to communicate with the mobile terminal 200. The security chip 520 and the NFC chip 530 include respective SWP terminals that enable their resources to be shared. Since the security chip 520 and the NFC chip 530 include the SWP terminals, the NFC chip 530 provides the mobile terminal 200 with NFC services to which a security function has been applied through connection with the security chip 520 without direct communication with the mobile terminal 200. The power sources Vcc and GND of the mobile terminal 200 are used as power sources for the NFC chip 530 as well as for the USIM chip 510 and the security chip 520.

As described above, the mobile terminal 200 may receive a user authentication function and an NFC service to which a security function has been applied at the same time because the USIM chip 510 uses the serial interface and the security chip 520 uses the USB interface.

Figure 7:
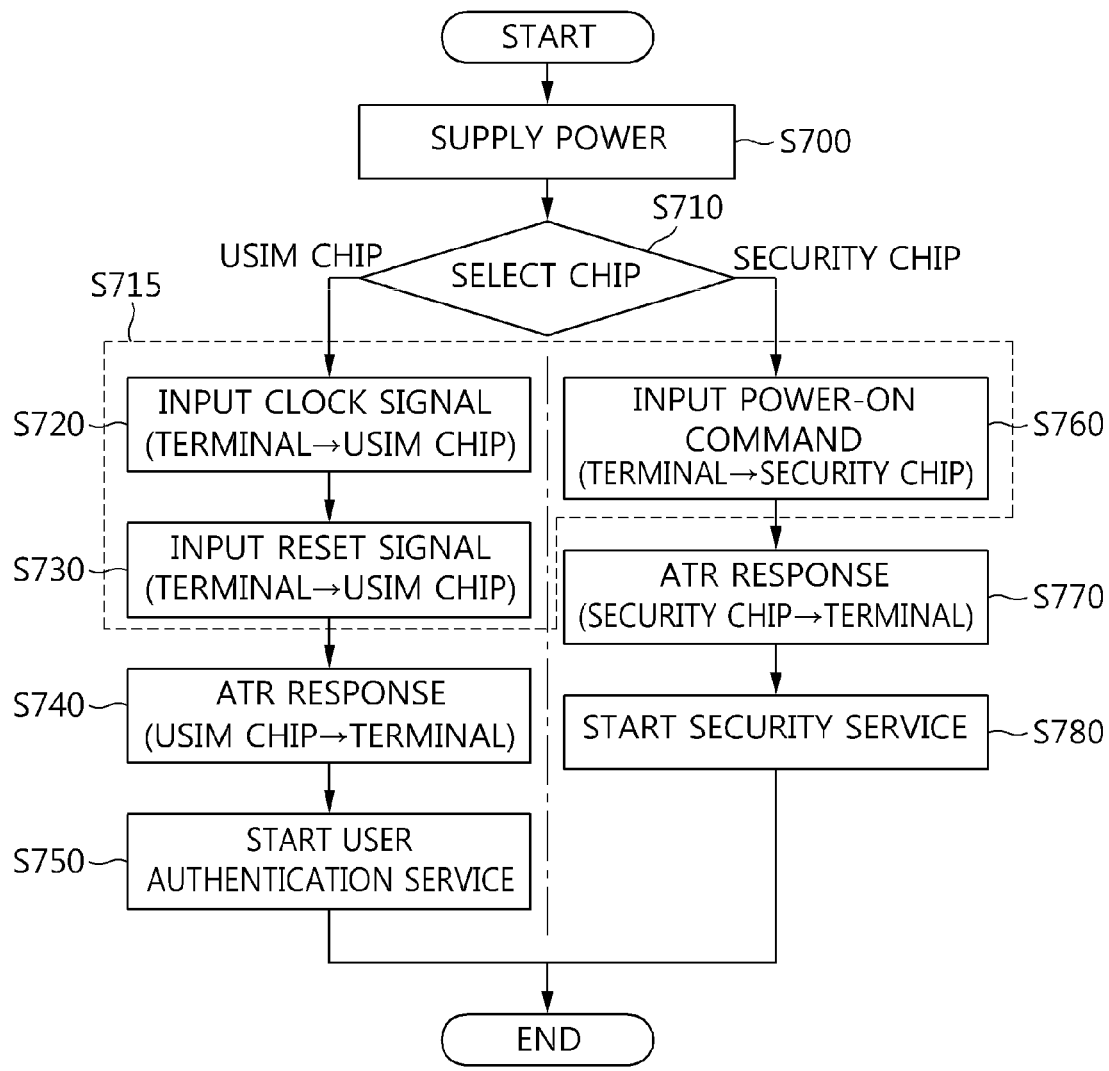
FIG. 7 is a flowchart illustrating a method for communication between chips, included in the universal subscriber identification module according to the present invention, and a mobile terminal.

FIG. 7 is a flowchart illustrating a method for communication between the chips, included in the universal subscriber identification module according to the present invention, and a mobile terminal.

Referring to FIG. 7, the mobile terminal according to an embodiment of the present invention supplies power to the power terminal of the universal subscriber identification module card slot at step S700. Accordingly, the USIM chip and the security chip may be supplied with power at the same time.

When the power is supplied, the mobile terminal selects one between the USIM chip and the security chip at step S710, and sends a reset response request message to the selected chip at step S715.

If the mobile terminal selects the USIM chip at step S710, the mobile terminal sends a clock signal to the USIM chip through the clock terminal of the universal subscriber identification module card slot at step S720. After the clock signal has been sent, the mobile terminal sends a reset signal having a logic value 1 to the USIM chip through the reset terminal of the universal subscriber identification module card slot at step S730.

After the reset signal has been sent, the USIM chip sends an Answer-To-Reset (ATR) response to the mobile terminal at step S740.

After receiving the ATR response from the USIM chip, the mobile terminal starts a user authentication service that is provided by the USIM chip at step S750.

If the mobile terminal selects the security chip at step S710, the mobile terminal inputs a power-on command to the security chip through the USB terminal of the universal subscriber identification module card slot at step S760.

After receiving the power-on command from the mobile terminal, the security chip sends an ATR response to the mobile terminal through the USB terminal at step S770.

After receiving the ATR response from the security chip, the mobile terminal starts a security service that is provided by the security chip at step S780.

Meanwhile, if the mobile terminal selects the security chip connected to the NFC chip at step S710, the mobile terminal inputs a power-on command to the security chip through the USB terminal of the universal subscriber identification module card slot at step S760.

After receiving the power-on command from the mobile terminal, the security chip sends an ATR response to the mobile terminal through the USB terminal at step S770.

After receiving the ATR response from the security chip, the mobile terminal starts an NFC service, including a security function, that is provided by the security chip and the NFC chip connected to the security chip at step S780.

The USIM chip and the security chip may be used at the same time by performing the above-described procedures at the same time.

As described above, the universal subscriber identification module card including the security chip for a mobile terminal and the communication method between a mobile terminal and the universal subscriber identification module card according to the present invention are not limited only to the configurations and methods of the above-described embodiments, and some or all of the embodiments may be selectively combined so that the embodiments can be modified in various ways.

As described above, in accordance with the present invention, an improved security service can be provided by including an additional security chip in the universal subscriber identification module card for the user authentication of a mobile terminal.

Furthermore, in accordance with the present invention, the USIM chip included in the universal subscriber identification module card of a mobile terminal communicates with the mobile terminal using the serial interface, and the security chip communicates with the mobile terminal using the USB interface. Accordingly, a communication method that is capable of providing the mobile terminal with a user authentication function and various security services at the same time can be provided.

Furthermore, in accordance with the present invention, an NFC service can be provided to an existing mobile terminal because the NFC chip, as well as the USIM chip and the security chip, is included in the universal subscriber identification module card.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A universal subscriber identification module card, comprising:
   a Universal Subscriber Identification Module (USIM) chip configured to perform user authentication of a mobile terminal;
   a pad configured to electrically connect the USIM chip to the mobile terminal when the universal subscriber identification module card is inserted into the mobile terminal; and
   a security chip configured to perform a security function for the mobile terminal independently of the USIM chip and to share two power terminals of the pad with the USIM chip,
   wherein the USIM chip communicates with the mobile terminal using a serial I/O terminal of the pad, and the security chip communicates with the mobile terminal using a Universal Serial Bus (USB) terminal of the pad, and
   wherein the USIM chip and the security chip communicate with each other using Single-Wired Protocol (SWP) terminals.

2. The universal subscriber identification module card of claim 1, further comprising a Near Field Communication (NFC) chip configured to provide an NFC function.

3. The universal subscriber identification module card of claim 2, wherein the NFC chip shares the two power terminals of the pad with the USIM chip and the security chip.

4. The universal subscriber identification module card of claim 3, wherein the security chip communicates with the NFC chip using SWP terminals, so that the mobile terminal communicates with the NFC chip.

5. The universal subscriber identification module card of claim 4, further comprising an antenna configured to be used for the NFC function.

6. The universal subscriber identification module card of claim 1, wherein the universal subscriber identification module card is any one of a Universal Subscriber Identification Module (USIM) card for a mobile phone for asynchronous third-generation mobile communication, a User Identification Module (UIM) card, and a Subscriber Identification Module (SIM) card for a mobile terminal for Global System for Mobile communications (GSM) that is a European digital mobile communication standard.

7. A method for communication between a mobile terminal and a universal subscriber identification module card, the method comprising:
   supplying power to both a Universal Subscriber Identification Module (USIM) chip and a security chip, included in the universal subscriber identification module card, through two power terminals of a pad included in the universal subscriber identification module card when the universal subscriber identification module card is inserted into the mobile terminal;
   sending a reset response request message from the mobile terminal to one of the USIM chip and the security chip;
   receiving, by the mobile terminal, an Answer-To-Reset (ATR) response from the one of the USIM chip and the security chip, the ATR response corresponding to the reset response request message; and
   connecting the mobile terminal to the one of the USIM chip and the security chip to receive a service from the one of the USIM chip and the security chip,
   wherein the service from the security chip comprise a security service for the mobile terminal, and
   wherein, after the mobile terminal is connected to the one of the USIM chip and the security chip, the USIM chip communicates with the mobile terminal using a serial interface, and the security chip communicates with the mobile terminal using a Universal Serial Bus (USB) interface,
   wherein the USIM chip and the security chip communicate with each other using Single-Wired Protocol (SWP) terminals.

8. The communication method of claim 7, wherein:
   the reset response request message comprises a clock signal and a reset signal when the one of the USIM chip and the security chip is the USIM chip;
   receiving the ATR response from the one of the USIM chip and the security chip includes receiving, by the mobile terminal, the ATR response from the USIM chip that has received the clock signal and the reset signal; and
   connecting the mobile terminal to the one of the USIM chip and the security chip includes connecting the mobile terminal to the USIM chip, and receiving, by the mobile terminal a user authentication service.

9. The communication method of claim 8, wherein the reset signal has a logic value of '1'.

10. The communication method of claim 7, wherein: the reset response request message comprises a power-on command when the one of the USIM chip and the security chip is the security chip;
   receiving the ATR response from the one of the USIM chip and the security chip includes receiving, by the mobile terminal, the ATR response from the security chip that has received the power-on command through a USB terminal; and
   connecting the mobile terminal to the one of the USIM chip and the security chip includes connecting, the mobile terminal that has received the ATR response, to a security chip, and receiving, by the mobile terminal, the security service.

11. The communication method of claim 7, wherein the supplying power to both a Universal Subscriber Identification Module (USIM) chip and a security chip further comprises supplying the power to an NFC chip as well as the USIM chip and the security chip through the two power terminals, the NFC chip connected to the security chip through SWP terminals, through the two power terminals.

* * * * *